2,893,760

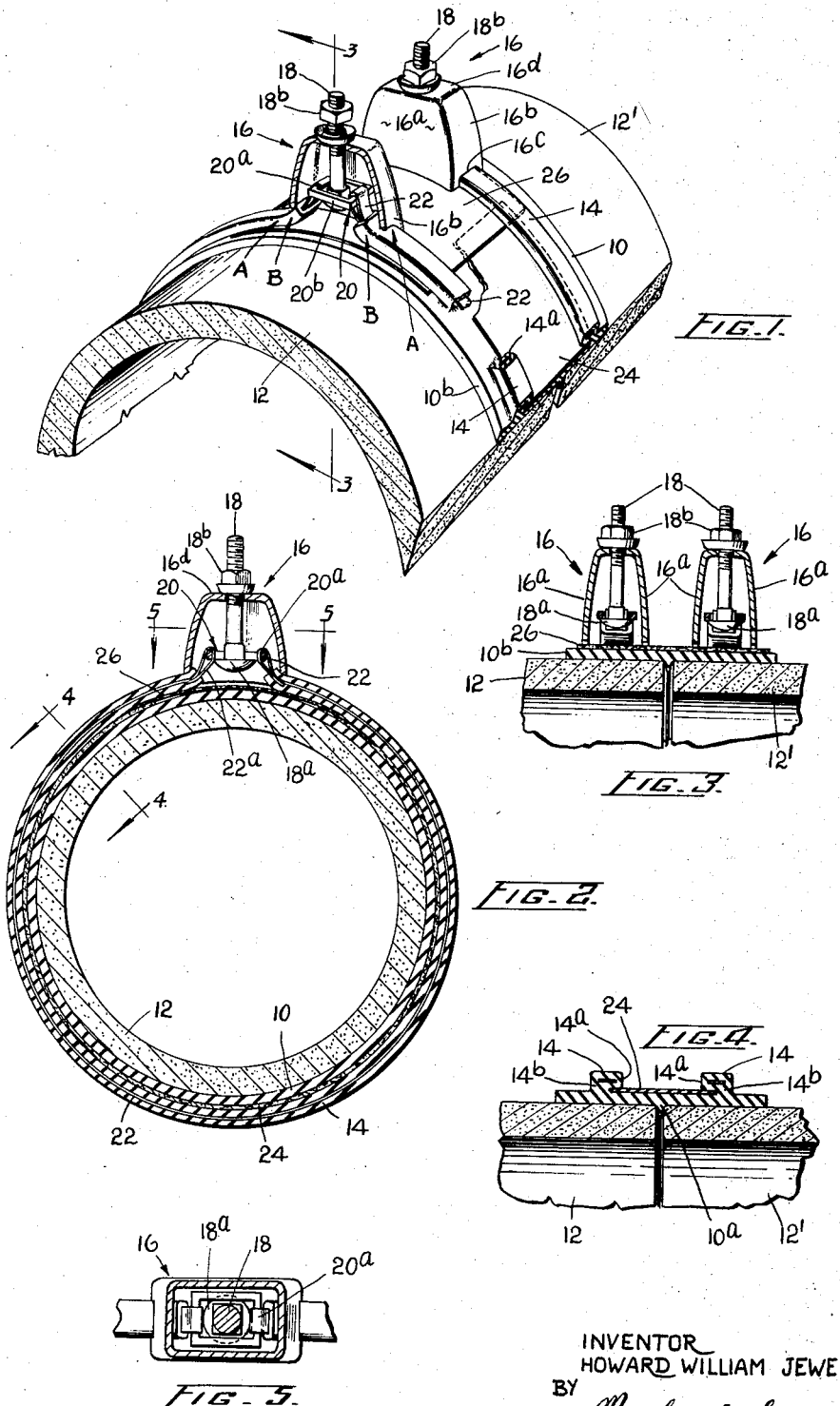

PIPE COUPLING INCLUDING ELASTOMERIC COVERED CLAMPING MEANS

Howard William Jewell, Islington, Ontario, Canada

Application August 15, 1957, Serial No. 678,315

2 Claims. (Cl. 285—369)

This application is a continuation-in-part of my application Serial No. 377,150, filed August 28, 1953, now U.S. Patent No. 2,846,243.

This invention relates to pipe couplings that are adapted for use with ceramic pipe having plain ends.

Particularly for use with ceramic pipe, it is important to provide pipe couplings that will positively and uniformly grip the adjacent ends of the pipe and that will be somewhat resilient so as to dispense with any necessity for absolute registration of the ends. My United States Patent No. 2,846,243, patented August 5, 1958 discloses a useful form of pipe coupling that is designed to satisfy most of the essential requirements for ceramic pipe use. This invention is intended to furnish certain improvements over the construction disclosed in that prior patent so as to achieve the same objects more advantageously. In particular, the principal object of this invention is to provide increased rigidity and strength in a pipe coupling of the type disclosed in the said patent.

In the accompanying drawings, in which each reference character denotes the same part in all the views, Figure 1 is a perspective view of a coupling according to the invention assembled over the joint between adjacent ends of two ceramic pipe sections, Figure 2 is a cross-section of the coupling, Figure 3 is a section on the line 3—3 in Figure 1, Figure 4 is a section on the line 4—4 in Figure 2, Figure 5 is a section on the line 5—5 in Figure 2.

Referring to the drawings, the principal structural element of the coupling according to the invention is a belt 10 of resiliently compressible material adapted to overlie the circumferential surfaces of pipe sections 12 and 12' and completely encircling the joint between the pipe sections. Preferably it has a particular cross-sectional form, as shown in the drawings (see Figures 2 and 4), including a central inwardly extending annular flange 10a, forming a stop ring for the pipe ends, and spaced-apart parallel passages in the material of the belt provided by hollow ridges 14 on the belt 10 near its outer or side edges 10b. Each of the ridges 14 is a tubular annulus of generally rectangular cross-section spaced radially from the belt for a part of its width inward of its inner edge 14a and integral with the belt for the remainder 14b of its width near its outer edge.

The resilient compressible material of the belt may be rubber or a synthetic rubber composition; the belt is particularly well adapted for manufacture by extrusion of such compositions from a suitable die.

A short length of each of the hollow ridges 14 is cut away at the same angular location on the belt 10, and over the gaps provided by the cut away portions of the ridges 14, housings 16 of plastic or cast metal, are disposed. Each of the housings 16 is the same as the other and has almost parallel side walls 16a joined by downwardly and outwardly sloping end walls 16b. The side walls are spaced apart by the width of each of the ridges 10b and the end walls in effect terminate above the bottom of the side walls to provide at each end a recess 16c which receives one of the open ends of the ridge 14. The recesses 16c should not, at the outer ends of the housing, be deeper than the normal height of the ridges 14, so that the outer ends of the housings, when they are seated on the belt, will hold the ridges in place, and the recesses will engage the resiliently compressible material of the belt and force the said material against the bands in the passages (as will be described below). The depth of the recesses increases toward the inside of the casing to provide smoothly curved lower surfaces blending with the inner surfaces of the end walls 16b.

Each housing has a top 16d having a central opening, and a bolt 18 having a head 18a extends from inside the housing up through the central opening. A nut 18b is threaded on its outer end. An open bridge 20 through which the bolt upwardly passes rests on the head of the bolt, and can be raised within the housing with the head of the bolt by tightening the nut 18b. The bridge 20 has end bars 20a connected by side bars 20b, and loosely surrounds the shank of the bolt 18, which preferably has a square cross-section fitting within the bridge as shown.

A thin and relatively narrow band 22 of sheet metal is passed through the passage in each of the hollow ridges 14 so as to extend completely around the belt 10 between the bridges 20 in the respective housing. The ends of the band pass between the pipe and the wall of the housing within the ridges 14. Each end of the band is bent upon itself to form a loop passing over one of the end bars 20a of the bridge, and the short end 22a of the loop extends back into the channel in the hollow ridge 14 to secure it.

The length of the band from one end bar 20a to the other on the bridge is such that when the bridge is lowered as near as possible to the surface of the belt 10 within the housing, the band extends through the ridge 14 without being under tension and even providing a little slack to accommodate stretching of the belt 10 if desired. Each band 22 can then be placed under whatever tension is required by turning the nut 18b to raise the bridge toward the head of the stud, thus causing the circumference of the belt 10 to contract. Some difference in size, as well as lack of axial registration, between the two pipes joined, may be allowed for by variations in the tightening of the two bands, and pipes of widely differing sizes may be joined if the belt 10 is suitably stepped so as to be larger on one side of the flange 10a than on the other.

The length of the housing 16 (and the corresponding arc length of the cut-away parts of the ridges 14) and the configuration of the notches 16c should be such that the points of tangency B of the bands 22 with the belt 10 (where the band starts to bend away from the belt to engage the bridge 20) are at or between the bolt 18 and the two bearing points A where the outer end walls of the housings engage the ridges 14 and prevent them from being pulled away from the pipe, as shown in the drawings. This enables the housings to be drawn inwardly when the bands are tightened so that the end walls of the housings will be seated on the parts of the coupling assembly that lie under them.

A suitable sealing composition, such as sulphur-silicia cement, hydraulic or Portland cement, or a resinous cementing composition, is inserted into the housing 16 before the bolts 18 are tightened.

The belt 10 is given a greater degree of rigidity in order to reduce the possibility of failure through internal pressure by reinforcing it with a stiffening membrane, band or web 24 overlying the belt 10 between the ridges 14. Because the ridges 10b are spaced radially from the belt for a part of their width inward of their inner, mutually facing edges, the inner edges of the web 24 extend into these spaces under the ridges, so that the bands 22 bear upon the edges of the stiffening web. The web can completely encircle the belt and the ends of the web can overlap at some convenient location.

The length of the stiffening web 24 is shorter than the length of the ridges so that it is interrupted to leave uncovered the part of the belt lying under the housing. Over the uncovered part of the belt a relatively rigid load-distributing member 26 is arranged under the housings so as to overlie the ends of the web. The load distributing member preferably extends to the outer edges of the belt and to enable it to do so, the ridges 14 are cut away from the belt by severing the parts 14b of their widths that are integral with the belt, for a short distance on each side of the location of the housings. The load distributing member is then arranged under the free ends 14c of the ridges, and the free ends of the ridges, enclosing the clamping band 22, extend between the walls of the housing and the load-distributing member.

The load-distributing member 26 should be made of a more rigid material than the materal of the stiffening web 24, and is preferably made of stainless steel, while the web itself may be composed of any semi-rigid material such as thin metal, fibre, Fiberglas, waterproof paper or plastic; a protective lining of kraft paper or similar thin flexible material may be disposed under the web is desired.

While a preferred embodiment of the invention has been described, it is to be appreciated that modifications and alterations may be made within the spirit and scope of this invention as defined in the following claims.

What I claim as my invention is:

1. A coupling for the joint between adjacent ends of two sections of pipe in end-to-end abutment, comprising a belt of resiliently compressible material encircling the circumferential surface of the adjacent pipe ends, two parallel hollow ridges integral with and spaced apart on the belt and providing passages within the material of the belt for substantially all its annular length, each of the ridges being disposed near one of the outer edges of the belt, the ridges being spaced radially from the belt for a part of their width inward of the inner, mutually-facing edges and being intergral with the belt for the remainder of their width near their outer edges, a stiffening web extending into the spaces between the ridges and the belt and overlying the flat surfaces of the belt between the said integral parts of the ridges, the stiffening web being interrupted to leave uncovered a part of the belt, the ridges being unconnected to the belt over the length of the uncovered part of the belt and over the ends of the stiffening web, a relatively rigid load-distributing member overlying the ends of the stiffening web and the uncovered part of the belt between them, housings disposed on the load-distributing member and having walls extending outwardly from the belt assembly, the load-distributing member extending axially of the pipe sections under the unconnected parts of the ridges at least as far as the axially outer surfaces of the housings, the end walls of the housing having recesses for the unconnected parts of the ridges under the end walls, the passages in the ridges opening into the housings, a clamping band extending through each passage whereby it extends under the end walls of the housing within the passage and projects into the housing, and tightening means in each of the housings connecting the ends of the band inside the housing, the tightening means being adapted to tighten the bands on the belt and draw the housings inwardly so that the recesses in the end walls of the housings will engage the resiliently compressible material and the end walls will force the material of the belt against the bands in the passages.

2. A coupling as claimed in claim 1 in which each of the housings has a top with a central opening and the tightening means in each of the housings comprises a bolt having a head inside the housing and a threaded shank extending through the opening, a nut on the outer end of the shank, and an open bridge resting on the head of the bolt and encircling the shank, the bridge having end bars and the ends of one of the said bands being looped over the end bars so that the ends of the band are moved toward the top of the housing when the nut is tightened.

References Cited in the file of this patent

UNITED STATES PATENTS

| 852,997 | Brandram | May 7, 1907 |
| 2,081,305 | Peterson | May 25, 1937 |
| 2,530,700 | Jewell et al. | Nov. 21, 1950 |
| 2,846,243 | Jewell | Aug. 5, 1958 |

FOREIGN PATENTS

| 234,639 | Switzerland | Feb. 1, 1945 |
| 131,610 | Australia | Mar. 3, 1949 |
| 754,527 | Great Britain | Aug. 8, 1956 |